United States Patent
Hazen

(10) Patent No.: US 9,457,886 B2
(45) Date of Patent: Oct. 4, 2016

(54) INTEGRAL ANTENNA WINGLET

(71) Applicant: SIERRA NEVADA CORPORATION, Sparks, NV (US)

(72) Inventor: Timothy M. Hazen, Sparks, NV (US)

(73) Assignee: SIERRA NEVADA CORPORATION, Sparks, NV (US)

( * ) Notice: Subject to any disclaimer, the term of this patent is extended or adjusted under 35 U.S.C. 154(b) by 333 days.

(21) Appl. No.: 14/049,085

(22) Filed: Oct. 8, 2013

(65) Prior Publication Data

US 2015/0042521 A1 Feb. 12, 2015

Related U.S. Application Data

(60) Provisional application No. 61/839,252, filed on Jun. 25, 2013.

(51) Int. Cl.
| | |
|---|---|
| *H01Q 1/28* | (2006.01) |
| *B64C 1/36* | (2006.01) |
| *B64C 23/06* | (2006.01) |
| *H01Q 1/48* | (2006.01) |
| *B64C 1/00* | (2006.01) |
| *H01Q 1/42* | (2006.01) |

(52) U.S. Cl.
CPC ............... *B64C 1/36* (2013.01); *B64C 1/0009* (2013.01); *B64C 23/065* (2013.01); *H01Q 1/283* (2013.01); *H01Q 1/287* (2013.01); *H01Q 1/48* (2013.01); *H01Q 1/42* (2013.01); *Y02T 50/164* (2013.01); *Y10T 29/49016* (2015.01)

(58) Field of Classification Search
CPC ........ H01Q 1/28; H01Q 1/286; H01Q 1/287; H01Q 1/30
USPC ................................ 343/705, 708, 787, 707
See application file for complete search history.

(56) References Cited

U.S. PATENT DOCUMENTS

| | | | |
|---|---|---|---|
| 4,635,066 A | 1/1987 | St. Clair et al. | |
| 7,624,951 B1 | 12/2009 | Kraft et al. | |
| 7,737,898 B2 | 6/2010 | Hanusa et al. | |
| 7,889,142 B1 | 2/2011 | Westman | |
| 2008/0210822 A1* | 9/2008 | Hanusa | H01Q 1/287 244/129.1 |
| 2011/0122033 A1* | 5/2011 | Sauer | H01Q 1/02 343/705 |
| 2012/0098714 A1 | 4/2012 | Lin et al. | |
| 2014/0159965 A1* | 6/2014 | Le | H01Q 1/28 343/705 |

FOREIGN PATENT DOCUMENTS

| | | |
|---|---|---|
| WO | WO-2004/066433 A2 | 8/2004 |
| WO | WO-2014/015127 A1 | 1/2014 |

\* cited by examiner

*Primary Examiner* — Dameon E Levi
*Assistant Examiner* — Collin Dawkins
(74) *Attorney, Agent, or Firm* — Mintz Levin Cohn Ferris Glovsky and Popeo, P.C.

(57) ABSTRACT

Disclosed is a winglet radome assembly, which can include at least one antenna assembly that can send and receive signals, such as radio waves. Some implementations of the winglet radome assembly can be secured to a wing of an aircraft, such as a fixed-wing aircraft. In addition, the winglet radome assembly can be configured to secure to a distal end of the wing and can be securely adapted to a variety of aircraft.

22 Claims, 5 Drawing Sheets

INTEGRAL ANTENNA WINGLET

REFERENCE TO PRIORITY DOCUMENT

This application claims the benefit of priority under 35 U.S.C. §119(e) of U.S. Provisional Patent Application Ser. No. 61/839,252 filed Jun. 25, 2013 under 37 C.F.R. §1.78(a). Priority of the filing date is hereby claimed and the full disclosure of the aforementioned application is incorporated herein by reference.

FIELD

The subject matter described herein relates to embodiments of an aircraft wing antenna for transmitting signals, such as radio waves, to and from the aircraft.

BACKGROUND

A radome can be an enclosure that is configured to protect an antenna. In addition, the radome can be constructed out of a material that minimally attenuates various types of signals transmitted or received by the antenna enclosed in the radome. The radome can be generally transparent to various electrical signals, such radio waves. Furthermore, radomes can be configured to protect antenna surfaces, such as from harsh weather, or to conceal the antenna from view.

SUMMARY

Disclosed herein are devices and methods related to embodiments of a winglet radome apparatus. An embodiment of the winglet radome apparatus may include an aerodynamic body configured to securely mate to a distal end of a wing of an aircraft, and where the body is made out of a material that allows uninterrupted transmission of a wireless signal through the material. In addition, the winglet radome apparatus may include an antenna assembly enclosed within the body and configured to at least one of send the wireless signal to or receive the wireless signal from at least one location outside the body. Additionally, the antenna assembly can include a grounding element that enables the antenna assembly to ground to at least the wing of the aircraft.

An embodiment of a method may include providing a winglet radome apparatus that includes an aerodynamic body configured to securely mate to a distal end of a wing of an aircraft. In addition, the body can be made out of a material that allows uninterrupted transmission of a wireless signal through the material. Additionally, the winglet radome apparatus can include an antenna assembly enclosed within the body and configured to at least one of send the wireless signal to or receive the wireless signal from at least one location outside the body. Furthermore, the antenna assembly can include a grounding element that enables the antenna assembly to ground to at least the wing of the aircraft. The method can further include securing the winglet radome apparatus to the distal end of the wing of the aircraft.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

Like reference symbols in the various drawings indicate like elements.

DETAILED DESCRIPTION

Figure 1:
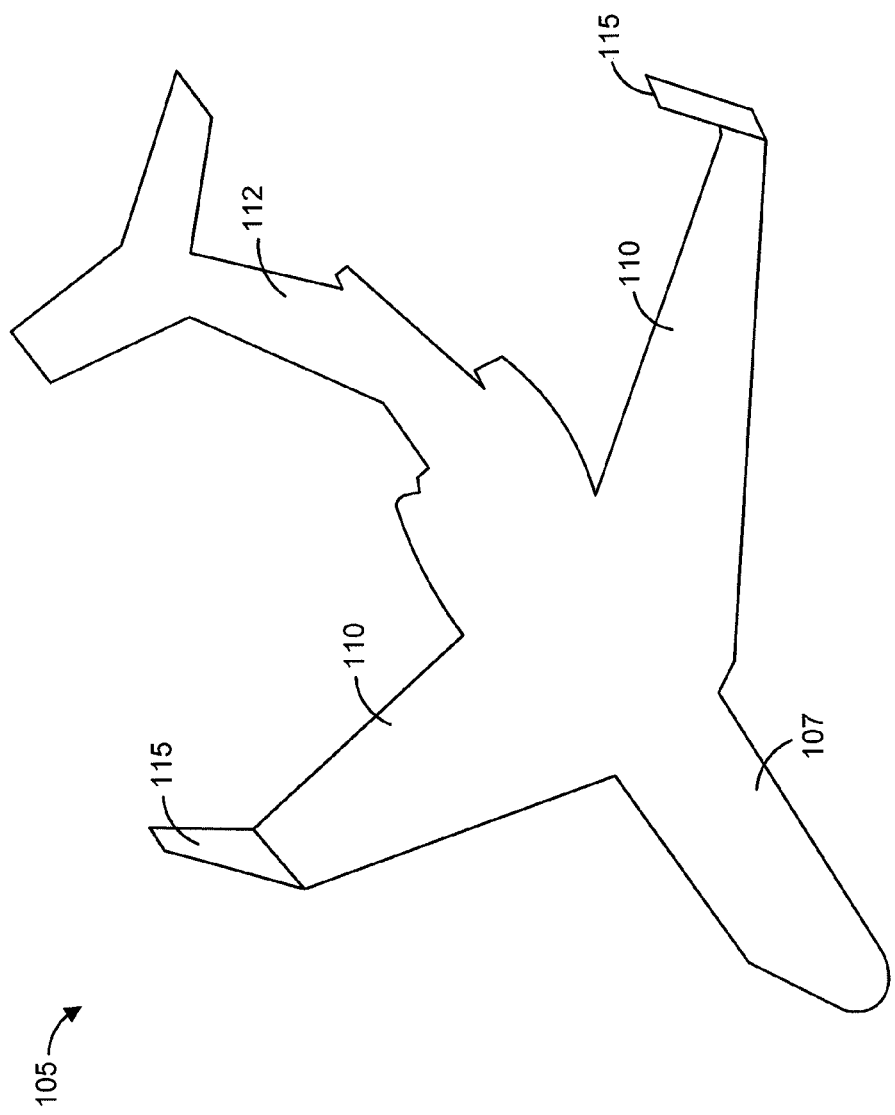
FIG. 1 shows a schematic representation of an aircraft.

Disclosed is a winglet radome assembly, which can include at least one antenna assembly and can be secured to a wing of an aircraft, such as a fixed-wing aircraft. In addition, the winglet radome assembly can be configured to secure to a distal end of the wing, including a wing configured to have the winglet radome assembly securely adapted or mated to the distal end of the wing. The winglet radome assembly can be securely adapted to a variety of aircraft in a variety of ways and can include a variety of features, including those features described herein.

In addition, more than one winglet radome assembly can be securely adapted to an aircraft, such as one winglet radome assembly secured to the distal end of both wings of a fixed-winged aircraft. Additionally, each winglet radome assembly can transmit or receive signals in one or more of a variety of directions, including omnidirectional. For example, having the winglet radome assembly securely adapted to the distal end of at least one wing of an aircraft can allow each winglet radome assembly to have an improved signal line of site. The improved signal line of sight can be due, at least in part, to the position of the winglet radome assembly at the distal end of the wing, such as compared to the winglet radome assembly positioned directly to or adjacent the fuselage of the aircraft.

Some implementations of the winglet radome assembly can include an outer housing or winglet body, which can be made out of one or more of a variety of materials, including materials that allow uninterrupted transmission of signals through the material. For example, the outer housing or winglet body can be made out of one or more of a variety of materials that, at most, minimally attenuate signals transmitted through the material. This can allow at least one antenna or antenna assembly enclosed in the winglet body to send and receive a variety of signals, such as to one or more locations outside the outer housing, without the outer housing significantly interfering with the transmission of the signals. For example, the winglet body can be made out of one or more of an E-glass, S-glass, Quartz, Epoxy, Cyanate-Ester, Bismaleimide, Polyimide, Boron, fiberglass fabric or fiberglass tape.

The winglet body of the winglet radome assembly can include one or more of a variety of features that can allow the winglet body to be securely adapted to the wing of an aircraft, such as the distal end of the wing. In addition, the winglet body can be any of a variety of sizes and shapes, including having an aerodynamic configuration. Additionally, the winglet body can be configured to improve the efficiency of the aircraft, such as by reducing drag.

Some implementations of the winglet radome assembly can include an antenna assembly, which can be housed within the winglet body. The antenna assembly can include a variety of features that can allow it to send and receive a variety of signals, including radio waves, to at least one or more locations outside the winglet body. Additionally, the antenna assembly can include a grounding element that can assist in grounding the antenna, such as grounding the antenna assembly to the wing of the aircraft.

The antenna assembly can be configured to operate at a variety of frequency bands. For example, the antenna assembly can be configured to operate at one or more of a frequency range of approximately 108 mHz to approximately 174 mHz, approximately 225 mHz to approximately 400 mHz, and approximately 960 mHz to approximately 1220 mHz (VHF/UHF/L-Band) frequencies.

FIG. 1 shows an example of a schematic representation of an aircraft 105 having a fuselage 107 and a pair of wings 110. Each wing 110 is shown as having an upturned wingtip or winglet 115 configuration at the distal end of each of the respective wings 110. In addition, the aircraft in FIG. 1 includes a tail 112 positioned at a rear end of the aircraft 105. The aircraft 105 representation shown in FIG. 1 is shown for example purposes and it should be appreciated that this disclosure is not limited to the specific shape or structure of the aircraft shown in FIG. 1.

Figure 2:
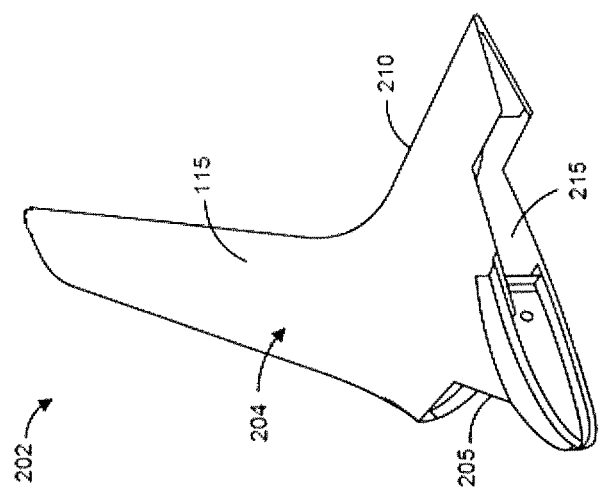
FIG. 2 shows a perspective view of an implementation of a radome winglet assembly that is configured to be mounted onto a wing of the aircraft.

FIG. 2 shows an implementation of a winglet radome assembly 202 that is configured to be securely mounted to a wing of an aircraft, such as a distal end of a fixed-wing aircraft. The winglet radome assembly 202 can be configured to be securely mounted to either the left or right wing of an aircraft and can also be configured to be securely mounted to one or more of a variety of aircraft, including a variety of aircraft wings.

In addition, the winglet radome assembly 202 can be configured to be securely mounted to the distal end of the wing such that the winglet radome 202 forms an extension, such as a distal extension, to the wing of the aircraft. Additionally, the winglet radome assembly 202 can be shaped and configured such that at least a part of the winglet radome assembly 202, when mounted to the distal end of the wing, extends along at least a part of the longitudinal axis of the wing. Furthermore, the winglet radome assembly 202 can be shaped and configured such that at least a part of the winglet radome assembly 202, when mounted to the distal end of the wing, deflects away from the longitudinal axis of the wing forming an upturned wingtip 115. However, the winglet radome assembly 202 can have any number of shapes and configurations.

Figure 3:
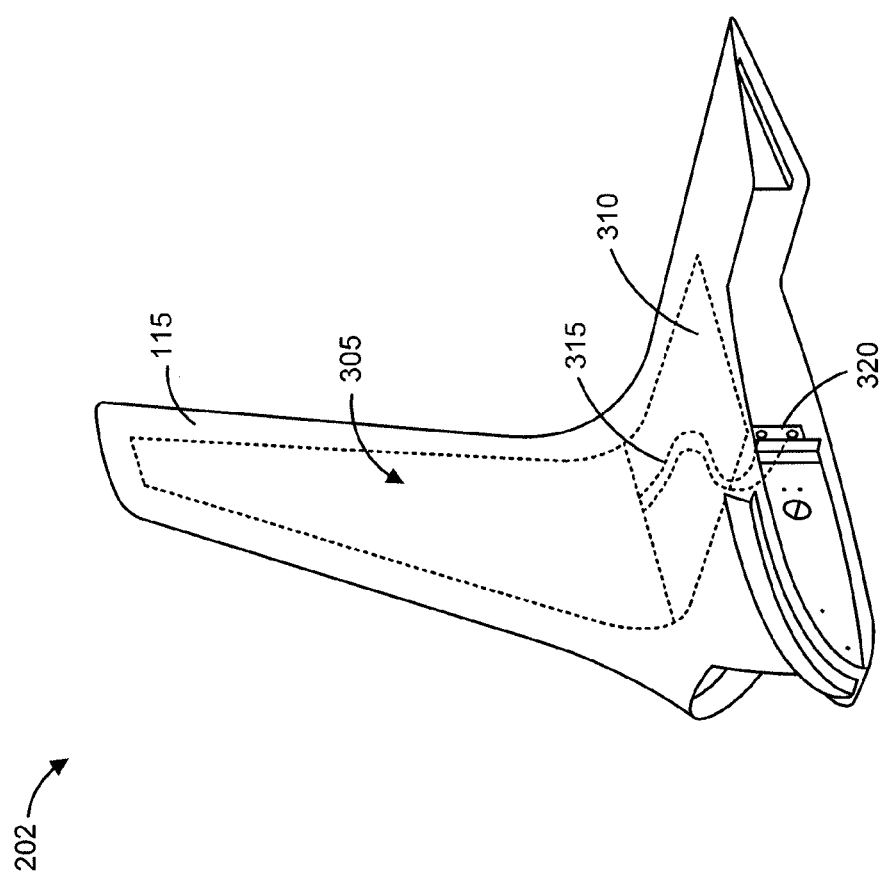
FIG. 3 shows an implementation of a winglet body with an exemplary position of an antenna assembly partially shown in phantom lines.

The winglet radome assembly 202 can include an outer housing or winglet body 204 configured to provide an enclosure, such as for at least a part of an antenna assembly 305, as shown in FIG. 3. In addition, the winglet body 204 can be made out of one or more materials that, at most, minimally attenuate the transmission of signals, including radio waves, through the material, such as at least the materials listed above. This can allow an antenna assembly 305 enclosed in the winglet body 204 to transmit and receive a variety of signals without the winglet body 204 significantly interfering with the transmitted signals.

The winglet body 204 can have a leading edge 205, a trailing edge 210, and can have an upturned winglet 115 portion. In addition, the winglet body 204 can include an inboard region 215 that can assist in securely mounting the winglet radome assembly 202 to the wing of the aircraft. For example, an inboard edge of the inboard region 215 may have a plate that is configured to be attached to the wing, such as by using bolts or other attachment members. The upturned winglet 115 can be located at a distal or outboard position of the wing when the winglet body 204 is mounted to the wing 110 (as shown, for example, in FIG. 1).

As discussed, an antenna assembly 305 can be positioned inside the winglet body 204. FIG. 3 shows an implementation of the winglet body 204 with an exemplary position of the antenna assembly 305 partially shown in phantom lines. The antenna assembly 305 can reside inside the winglet body 204, including at least partially within at least a portion of the upturned winglet 115 portion. The antenna assembly 305 can include a grounding element 310 also located inboard of the winglet body 204. In addition, one or more wire members 315 can be at least partially secured to the grounding element 310 and connect the antenna assembly 305 to a connector plate 320 located at the inboard edge of the winglet body 204.

Figure 4:
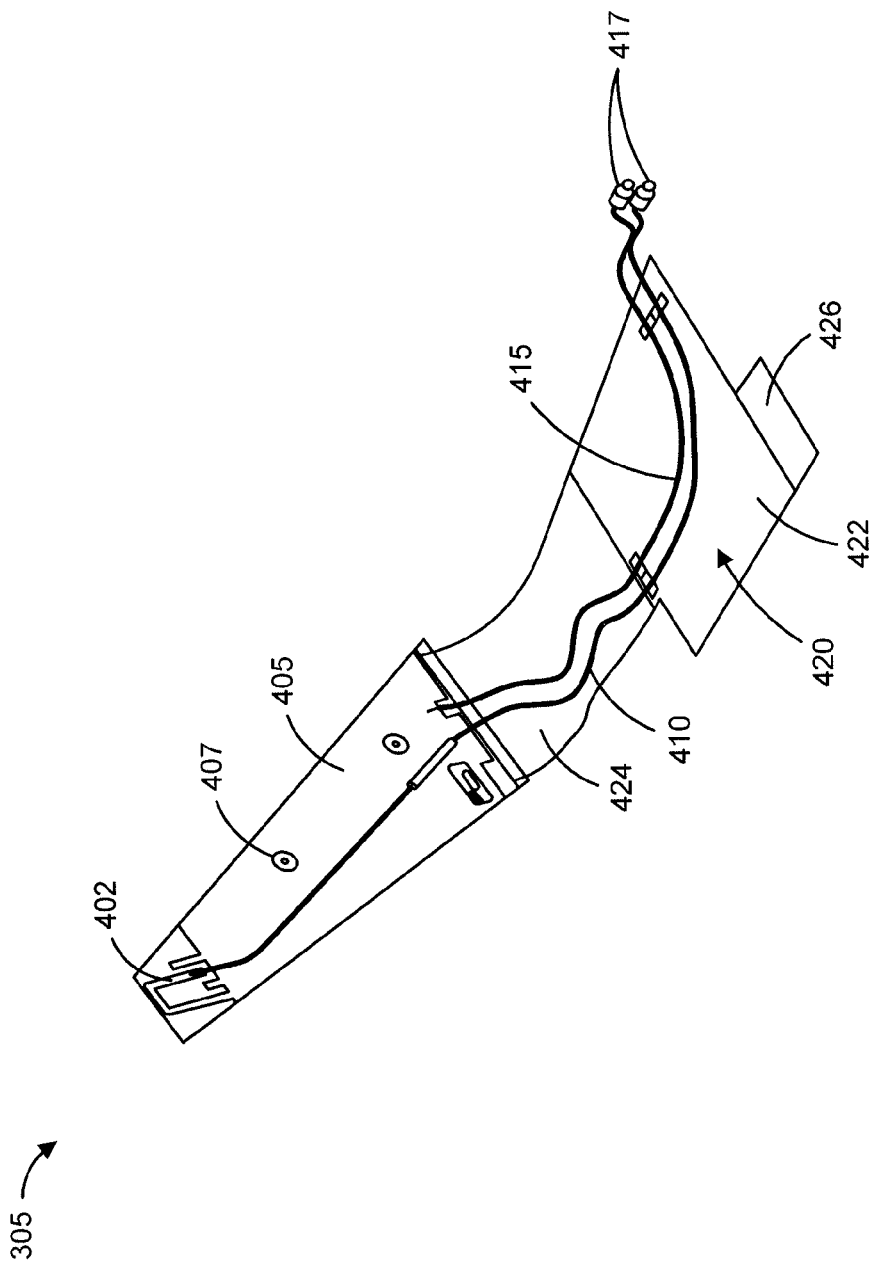
FIG. 4 shows an implementation of an antenna assembly.

FIG. 4 shows an implementation of an antenna assembly 305 that can be at least partially enclosed within the winglet body 204 of the winglet radome assembly 202. The antenna assembly 305 can include at least one high band etching pattern 402 that can be positioned within a distal end of the winglet body 204. The high band etching pattern 402 can assist in propagating the transmission of radio waves. Any number of a variety of high band etching patterns 402 can be included in the antenna assembly 305.

In addition, the antenna assembly 305 can include a printed circuit board (PCB) element 405 that extends within and along a length of the winglet body 204, such as at least within and along the upturned wingtip 115. The PCB element 405 can extend from the high band etching pattern 402 and provide a support for one or more wire members 315 of the antenna assembly, as will be described in greater detail below. In addition, the PCB element 405 can include one or more mounting features, such as mounting holes 407 which can assist in securing the position of at least a part of the antenna assembly 305 relative to the inside of the winglet body 204. For example, fasteners, such as screws, can be secured through the one or more mounting holes 407, which can secure the position of at least the PCB element 405.

In some implementations, the antenna assembly 305 can include a high band cable 410, a low band cable 415 and a grounding element 420. For example, the grounding element 420 can include a grounding plane 422, a flexible region 424 and a grounding strap 426. The grounding plane 422 can be rigid and allow the low band cable 415 and high band cable 410 to be secured along a length to the grounding plane 422.

In addition, the flexible region 424 can be made out of a flexible material and may not have the low band cable 415 and high band cable 410 attached along a length to the flexible region 424. This can allow for strain relief for the low band cable 415 and high band cable 410 and allow the flexible region 424 to flex, such as during flexing or bending of the winglet body. The flexible region 424 can assist in allowing the antenna assembly 305 to adapt to flexure in the winglet radome assembly 202, such as during movement or bending of the wing during flight.

Additionally, the grounding strap 426 can be configured to mate directly with the wing and provide conductivity between the antenna assembly 305 and at least the wing, which can establish a ground plane. In some implementations, the grounding strap 426 can be approximately 6 inches in length. In addition, the grounding element can be made out of one or more of a copper material, copper coated material, tin-plated copper, or a highly conductive metal that is plated for corrosion resistance. The grounding element can include one or more parts and have a variety of features.

The high band cable 410 can extend from the high band etching pattern 402 to an inboard location where it can be connected to additional wiring. In addition, the low band cable 415 can extend from the PCB element 405 to the inboard location as well. Both the high band cable 410 and the low band cable 415 can pass along at least a part of the grounding element 420, such as the flexible region 424 and grounding plane 422, and may be bonded to a part of the grounding element 420, such as the grounding plane 422. Additionally, the low band cable 415 and high band cable 410 may terminate in one or more electrical terminals 417, as shown in FIG. 4. For example, some implementations of the antenna assembly can include a 50-ohm coaxial RF low band cable 415 (i.e., <800 mHz) and a 50-ohm coaxial RF high band cable 410 (i.e., >800 mHz).

In some implementations, the grounding plane 310 can be a mesh structure attached, such as bonded, to a lower skin (described below) of the winglet body 204. The mesh structure can be configured to follow any curvature of the winglet body 204. The grounding plane 422 may vary in size. In an implementation, the grounding plane 422 can be approximately 12 inches in length and span from a distance within the winglet body 204 to the inboard edge of the winglet body 204.

Figure 5:
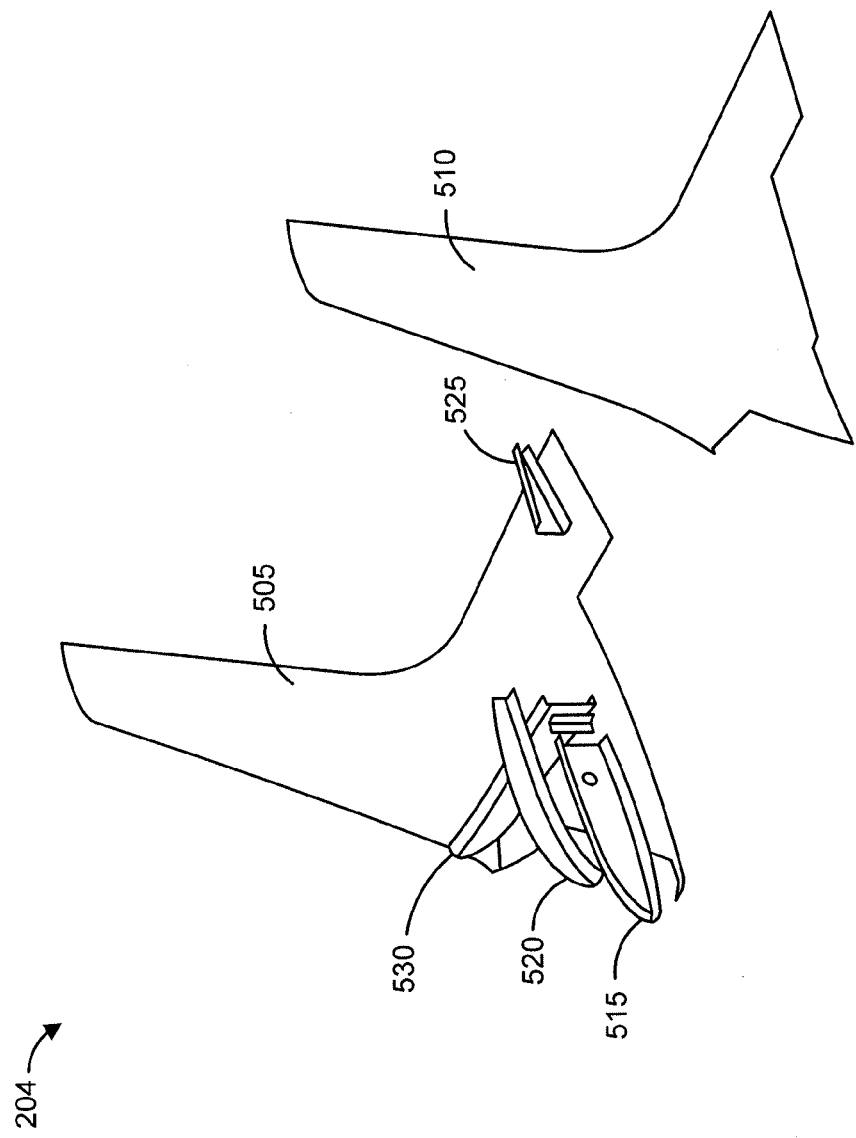
FIG. 5 shows an exemplary winglet body in an exploded state.

FIG. 5 shows an implementation of the winglet body 204 in an exploded state. For example, the winglet body 204 can include a lower skin 505 that defines the bottom outer shape of the winglet body 204. The winglet body 204 can further include an upper skin 510 that defines the upper outer shape of the winglet body 204. In the assembled state, the antenna assembly 305 (as shown, for example, in FIG. 3) can be positioned between the lower skin 505 and the upper skin 510.

At least one cavity or gap may be positioned between the antenna assembly 305 and the upper skin 510 and/or between the antenna assembly 305 and the lower skin 505. The gap may be filled with air or other material that assists in dissipation of heat. For example, one or more of a variety of honeycomb material can be contained within the winglet body 204, including filling a portion of the at least one cavity or gap. In an implementation, the upper skin 510 and lower skin 505 are at least partially made of a fiberglass/epoxy composite material, although it should be appreciated that other materials may be used, including the materials disclosed herein.

An inboard rib 515 with a leading edge strake 520 can be located at an inboard edge of the winglet body 204. A trailing edge rib 525 can be located at the trailing edge of the winglet body 204. Furthermore, a span rib 530 can span the winglet body 204 from the inboard edge toward an outboard location. One or more of the inboard rib 515, leading edge strake 520, trailing edge rib 525 and span rib 530, upper skin 510 and lower skin 505 can be configured to assist in securely mating the winglet radome assembly 202 to the distal end of the wing. In addition, one or more of the inboard rib 515, leading edge strake 520, trailing edge rib 525 and span rib 530, upper skin 510 and lower skin 505 can assist in securing or mounting additional features to the winglet radome assembly 202, such as lights, lightning strips, etc.

In addition, one or more securing features can be included with the winglet body 204 for assisting in securing the winglet radome assembly 202 to the wing. Additionally, mounting features, such as screw holes can be included or custom made for securing the winglet radome assembly 202 to the wing.

As discussed above, the antenna assembly 305 can be configured to operate at one or more of a frequency range of approximately 108 mHz to approximately 174 mHz, approximately 225 mHz to approximately 400 mHz, or approximately 960 mHz to approximately 1220 mHz (VHF/UHF/L-Band) frequencies. In addition, some implementations of the antenna assembly 305 can fit within a trapezoidal envelope sized approximately 20 inches tall, approximately 12 inches long at the inboard base, and approximately 3 inches long at the outboard tip.

While this specification contains many specifics, these should not be construed as limitations on the scope of an invention that is claimed or of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination.

Moreover, although features may be described above as acting in certain combinations and even initially claimed as such, one or more features from a claimed combination can in some cases be excised from the combination, and the claimed combination may be directed to a sub-combination or a variation of a sub-combination. Similarly, while operations are depicted in the drawings in a particular order, this should not be understood as requiring that such operations be performed in the particular order shown or in sequential order, or that all illustrated operations be performed, to achieve desirable results. Only a few examples and implementations are disclosed. Variations, modifications and enhancements to the described examples and implementations and other implementations may be made based on what is disclosed.

What is claimed is:

1. A winglet radome apparatus, comprising:
an aerodynamic body configured to securely mate to a distal end of a wing of an aircraft, wherein the body comprises a leading edge, a trailing edge, a lower skin that extends between the leading edge and the trailing edge and defines a bottom surface of the body, and an upper skin that extends between the leading edge and the trailing edge and defines an upper surface of the body, and wherein the entire body is made entirely out of a material that allows uninterrupted transmission of a wireless signal through the material;
an antenna assembly enclosed within the body and configured to at least one of send the wireless signal to or receive the wireless signal from at least one location outside the body, the antenna assembly including a grounding element that enables the antenna assembly to ground to at least the wing of the aircraft.

2. The winglet radome apparatus of claim 1, wherein the grounding element is made out of one or more of a copper material, copper coated material, tin-plated copper, or a highly conductive metal that is plated for corrosion resistance.

3. The winglet radome apparatus of claim 1, wherein the grounding element includes a ground strap configured to directly mate with the wing and provide conductivity between the antenna assembly and the wing.

4. The winglet radome apparatus of claim 1, wherein at least the body forms an extension to the wing of the aircraft when the body is securely mounted to the distal end of the wing.

5. The winglet radome apparatus of claim 4, wherein the body extends along at least a part of a longitudinal axis of the wing.

6. The winglet radome apparatus of claim 5, wherein the distal end of the body deflects away from the longitudinal axis of the wing forming an upturned wingtip.

7. The winglet radome apparatus of claim 6, wherein at least a part of the antenna assembly resides in the upturned wingtip.

8. The winglet radome apparatus of claim 1, wherein the antenna assembly includes a low band cable and a high band cable.

9. The winglet radome apparatus of claim 1, wherein the wireless signal includes a radio wave.

10. The winglet radome apparatus of claim 1, wherein the body is made out of one or more of an E-glass, S-glass, Quartz, Epoxy, Cyanate-Ester, Bismaleimide, Polyimide, Boron, fiberglass fabric or fiberglass tape.

11. The winglet radome apparatus of claim 1, wherein the antenna assembly is configured to operate at one or more of a frequency range of 108 mHz to 174 mHz, 225 mHz to 400 mHz, or 960 mHz to 1220 mHz.

12. A method, comprising:
providing a winglet radome apparatus including an aerodynamic body configured to securely mate to a distal end of a wing of an aircraft, wherein the body comprises a leading edge, a trailing edge, a lower skin that extends between the leading edge and the trailing edge and defines a bottom surface of the body, and an upper skin that extends between the leading edge and the trailing edge and defines an upper surface of the body, and wherein the entire body is made entirely out of a material that allows uninterrupted transmission of a wireless signal through the material;
an antenna assembly enclosed within the body and configured to at least one of send the wireless signal to or receive the wireless signal from at least one location outside the body, the antenna assembly including a grounding element that enables the antenna assembly to ground to at least the wing of the aircraft; and
securing the winglet radome apparatus to the distal end of the wing of the aircraft.

13. The method of claim 12, wherein the grounding element is made out of one or more of a copper material, copper coated material, tin-plated copper, or a highly conductive metal that is plated for corrosion resistance.

14. The method of claim 12, wherein the grounding element includes a ground strap configured to directly mate with the wing and provide conductivity between the antenna assembly and the wing.

15. The method of claim 12, wherein at least the body forms an extension to the wing of the aircraft when the body is securely mounted to the distal end of the wing.

16. The method of claim 15, wherein the body extends along at least a part of a longitudinal axis of the wing.

17. The method of claim 16, wherein the distal end of the body deflects away from the longitudinal axis of the wing forming an upturned wingtip.

18. The method of claim 17, wherein at least a part of the antenna assembly resides in the upturned wingtip.

19. The method of claim 12, wherein the antenna assembly includes a low band cable and a high band cable.

20. The method of claim 12, wherein the signal includes a radio wave.

21. The method of claim 12, wherein the body is made out of one or more of an E-glass, S-glass, Quartz, Epoxy, Cyanate-Ester, Bismaleimide, Polyimide, Boron, fiberglass fabric or fiberglass tape.

22. The method of claim 12, wherein the antenna assembly is configured to operate at one or more of a frequency range of 108 mHz to 174 mHz, 225 mHz to 400 mHz, or 960 mHz to 1220 mHz.

\* \* \* \* \*